April 21, 1953

C. SCHRAMM 2,635,262

MACHINE FOR CREASING AND PRESSING BOOKS

Filed Jan. 16, 1947

April 21, 1953  C. SCHRAMM  2,635,262
MACHINE FOR CREASING AND PRESSING BOOKS
Filed Jan. 16, 1947  5 Sheets-Sheet 2

Inventor
Carl Schramm
by S. Jay Teller
Attorney

April 21, 1953          C. SCHRAMM          2,635,262
MACHINE FOR CREASING AND PRESSING BOOKS
Filed Jan. 16, 1947                     5 Sheets-Sheet 5

Patented Apr. 21, 1953

2,635,262

UNITED STATES PATENT OFFICE 2,635,262

MACHINE FOR CREASING AND PRESSING BOOKS

Carl Schramm, North Coventry, Conn., assignor to The Smyth Manufacturing Company, Hartford, Conn., a corporation of Connecticut Application January 16, 1947, Serial No. 722,343

11 Claims. (Cl. 11—1)

The present invention relates to a machine of the type disclosed in my prior patent for Machine for Creasing the Joints of Books, No. 2,151,991, dated March 28, 1939. The machine shown in the said patent serves to apply paste to successive book fillers and to assemble the pasted fillers with covers. Then the assembled books are moved intermittently from station to station through the machine, and are engaged by successive sets of creaser jaws which form creases at the cover joints. The assembled books are also pressed at one station to firmly engage the covers with the pasted fillers.

The general object of the invention is to provide a machine of the type described having a final station at which the books are supplementally pressed to flatten the covers and to definitely assure their firm adherence to the pasted filler.

Other and more specific objects of the invention will be apparent from the drawings and from the following specification and claims.

In the drawings I have shown in detail a preferred embodiment of the invention, but it will be understood that various changes may be made from the construction shown, and that the drawings are not to be construed as defining or limiting the scope of the invention, the claims forming a part of this specification being relied upon for that purpose.

Of the drawings:

Fig. 1ª is a side view of the left portion of a machine embodying the invention, the carrier jaws being in their positions toward the left or toward the discharge end of the machine.

Fig. 2 is an enlarged fragmentary vertical sectional view taken along the line 2—2 of Fig. 1.

Referring to the drawings, 6 represents the main frame of the machine as disclosed in my aforesaid patent, this frame having side plates 8, 8 which carry many of the movable parts of the machine.

Figure 1:
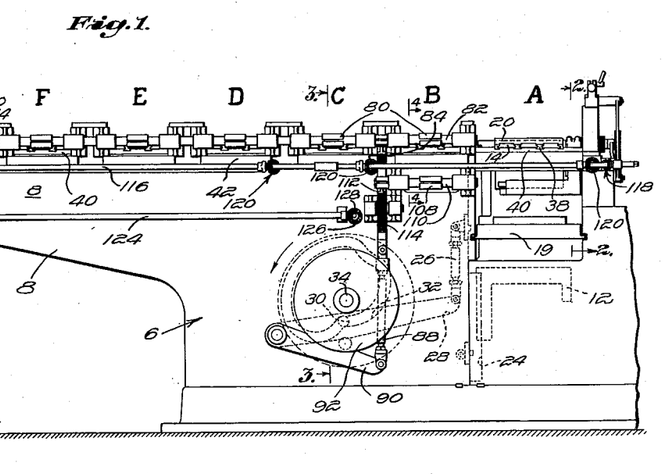
Fig. 1 is a side view of the right portion of a machine embodying the invention, the carrier jaws being in their positions toward the right or toward the feeding end of the machine.
Figures 1A, 2:
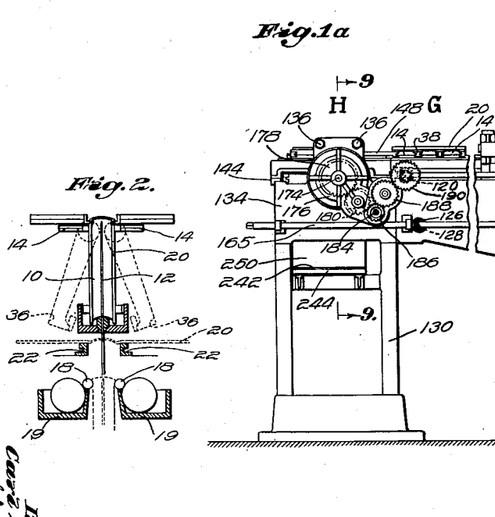

The stitched book fillers 10 are opened and placed by hand or fed by suitable mechanism onto a vertically movable saddle plate 12, as shown in Fig. 2. The upward movement of this plate lifts the fillers into the zone of action of carrier jaws 14, 14 and creaser jaws 16, 16. In its upward movement each filler passes between rolls 18, 18 in paste boxes 19, 19 which apply paste to its outer leaves. The filler then passes into a cover 20, which is folded down against the pasted leaves. The cover rests upon cover supporting members 22, 22 to which successive covers may be supplied by hand or fed by a suitable mechanism.

As shown in Fig. 1, one edge of the saddle plate is secured to a vertically movable slide 24 which is connected by a link 26 to a lever 28 that is oscillated by means of a roller 30 engaging a cam groove in a cam 32 on a cam shaft 34. Before the plate descends the lower ends of pivoted arms 36, 36, operated by mechanism not shown, swing in beneath the lower edges of the book and retain it at the level at which it is to be carried through the machine. As the saddle plate 12 is withdrawn, the book is supported by the arms 36, 36 and the first set of carrier jaws 14, 14 are closed against its sides.

Figure 3:
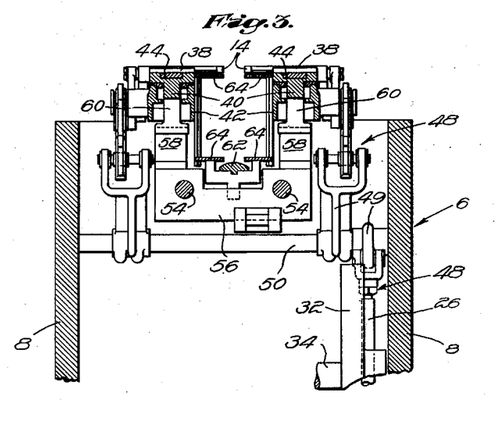
Fig. 3 is an enlarged fragmentary vertical sectional view taken along the line 3—3 of Fig. 1, but omitting the creasing and pressing jaws and the parts directly associated therewith.
Figure 8:
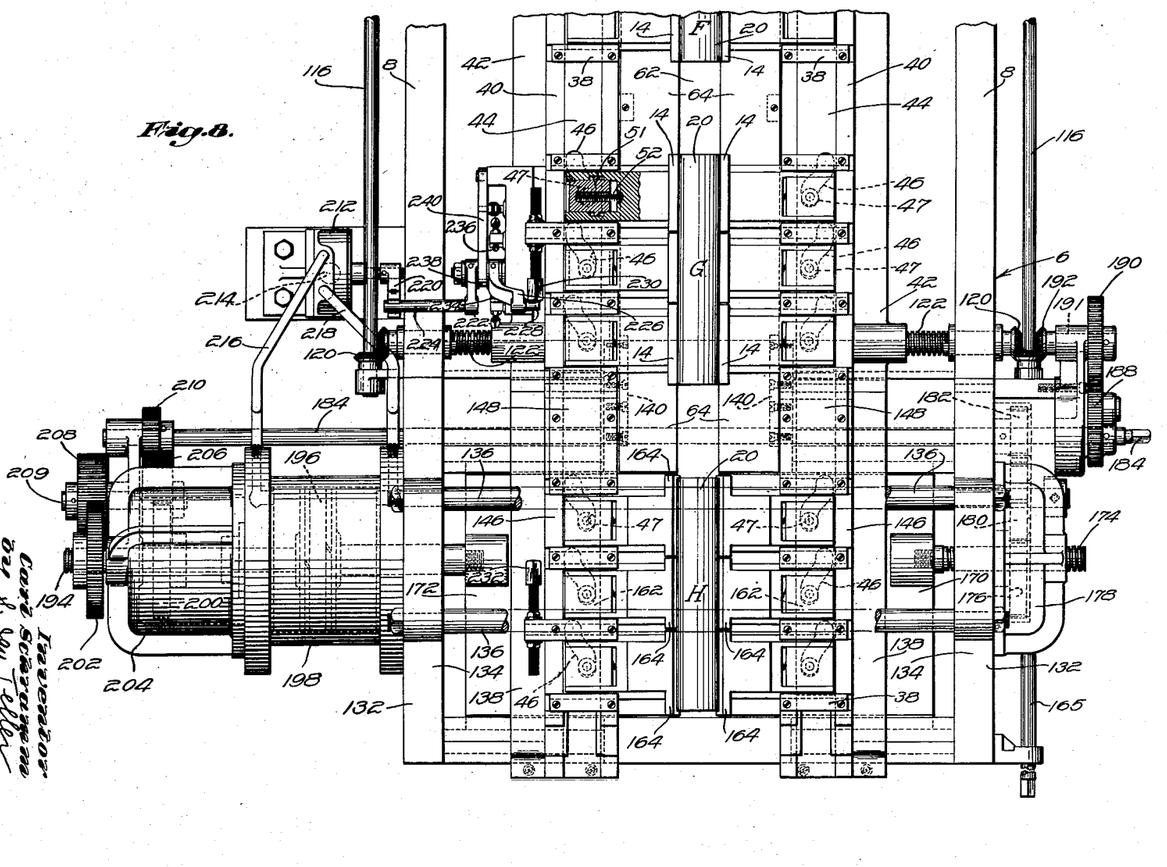
Fig. 8 is an enlarged plan view of the portion of the machine shown in Fig. 1ª.

The carrier jaws 14, 14 are arranged in sets of six, each set comprising three jaws on one side of the book path and three on the other side. These jaws are movable in and out in ways formed between gibs 38, 38 that are fastened to the upper surfaces of longitudinally reciprocable carriages 40, 40 as shown in Figs. 1 and 3. The carriages are supported and guided by non-reciprocable rails 42, 42 which extend longitudinally of the machine. Movable longitudinally in the respective carriages are slides 44, 44 that extend beneath all of the sets of carrier jaws. As shown in Fig. 8, the slides have cam slots 46, 46 in which are pins or rolls 47, 47 connected to the carrier jaws.

The slides 44, 44 are reciprocated longitudinally relatively to the carriages 40, 40 in timed relation with the operation of other parts of the machine. The slides are so reciprocated by suitable mechanisms 48, 48 shown in part in Fig. 3 and shown in detail in the aforesaid patent. The said mechanisms are actuated by arms 49, 49 on a transverse shaft 50 which is oscillated by a cam on the cam shaft 34. The said mechanisms 48, 48 are so constructed that they operate irrespectively of the longitudinal reciprocation of the carriages 40, 40. As the slides 44 are reciprocated the cam slots impart in and out movements simultaneously to all of the carrier jaws. As the jaws 14, 14 move inward, those of each set engage a book at the upper portions of the cover thereof, and as the jaws move outward the book is disengaged. Preferably, as shown in the upper left hand portion of Fig. 8, a block 51 is associated with each jaw 14, the aforesaid roll 47 being carried by the block. Each jaw is transversely movable, within narrow limits, with respect to its block, and a spring 52 biases the jaw for relative inward movement. Thus the jaws can accommodate themselves to minor irregularities or differences in sizes in the books.

The carriages 40, 40 which support the carrier jaws 14, 14 and the slides 44, 44 extend longitudinally of the machine and are reciprocable longitudinally along the rails 42, 42. As shown in Fig. 3, two guide rods 54, 54 extend longitudinally of the machine, and a cross head 56 is reciprocable along the guide rods by means of a suitable mechanism operated by a cam on the shaft 34, but not shown. Projecting upward from the cross head 56 are posts 58, 58, which have tongue-and-groove connection with blocks 60, 60 attached to the bottoms of the carriages 40, 40. The tongue-and-groove connections permit the guide rails and the parts carried thereby to be transversely adjusted as hereinafter explained. It will be observed that longitudinal reciprocation of the cross head 56 causes similar reciprocation of the carriages 40, 40 and of the parts carried thereby.

The reciprocation of the carriages 40, 40 and the reciprocation of the slides 44 relatively to the carriages are so timed in relation to the movement of the saddle plate 12 that the jaws 14, 14 of the first set are engaged with a book on the saddle plate 12 immediately before movement of the carriages toward the left as viewed in Fig. 1. Simultaneously, the jaws of the other sets are engaged with other books at successive stations spaced along the machine toward the left. Thus, as the carriages move toward the left each book is engaged and moved to the next following station. When the books reach the several stations, the slides 44, 44 are moved relatively to the carriages so as to withdraw the carrier jaws and release the books, whereupon the carriages are moved toward the right and the described cycle of operations is repeated. The books during their movement travel along a supporting rail 62 and between guide rails 64, 64, shown in Figs. 3 and 8.

The number of stations in the machine may be varied, but as shown in Figs. 1 and 1ᵃ there are eight stations designated respectively as A, B, C, D, E, F, G and H. When there are eight stations there are six sets of carrier jaws 14, 14. With the carriages 40, 40 in their positions at the right, the sets of carrier jaws 14, 14 are at stations A, B, C, D, E and F. With the carriages 40, 40 in their positions at the left the carrier jaws are at stations B, C, D, E, F and G.

Figure 4:
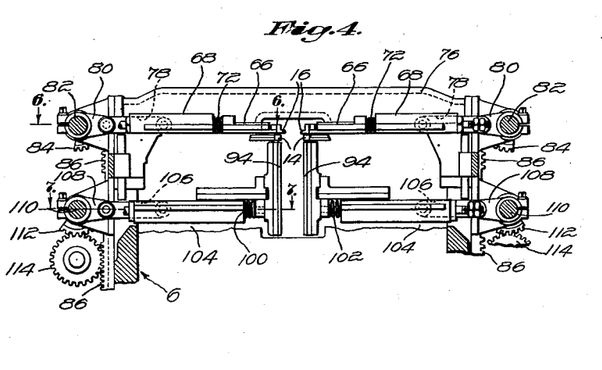
Fig. 4 is an enlarged fragmentary vertical sectional view taken along the line 4—4 of Fig. 1, but omitting the carrier jaws and the parts directly associated therewith.
Figure 5:
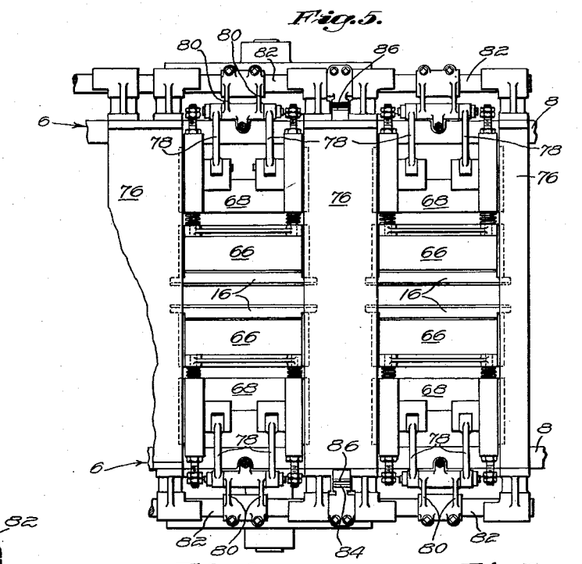
Fig. 5 is a fragmentary plan view showing two sets of creaser jaws and the parts directly associated therewith.
Figure 6:
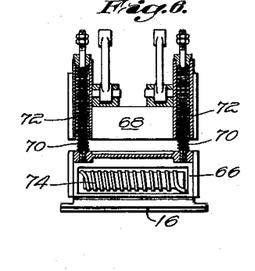
Fig. 6 is a fragmentary sectional view taken along the line 6—6 of Fig. 4.

There are sets of creaser jaws 16, 16 arranged slightly above the carrier jaws 14, 14 at the several stations, except at the first or feeding station A and except at the last two stations G and H. Otherwise stated, there are five sets of creasing jaws 16, 16 located respectively at stations B, C, D, E and F. As shown in Figs. 4, 5 and 6, the creaser jaws are attached to slides, each of which is desirably formed in two sections 66, 68 that are connected by pins 70 and interposed springs 72 so arranged that the creasers will be cushioned when forced against the books. The inner sections 66 are provided with electrical heating elements 74. The side edges of the creaser slides are movably supported in grooves in cross heads 76, 76 that are secured to the tops of the side plates 8 of the main frame 6. Connected with the rear sections of the creaser slides are toggle links 78, 78 that are joined to toggle links 80, 80 which are secured to shafts 82, 82 at the respective sides of the machine and which extend longitudinally and are supported by brackets attached to the cross heads 76, 76. By the breaking of the toggle links the creaser jaws are drawn from the book path and by the straightening of the toggle links the creaser jaws are closed and held against the books.

Each shaft 82 is provided with a segmental gear 84 which is engaged by a vertically movable rack 86. The lower end of each rack is connected by a link 88 with a lever 90 that is oscillated by a cam 92 on the shaft 34, as shown in Fig. 1. By this means all the creaser jaws are simultaneously closed in toward the book path and opened out from the book path, the books being advanced successively between the creaser jaws when the creaser jaws are open. The creaser jaws thus successively apply pressures and heat to each covered book along the line of its joints, i. e. in lines parallel with and a short distance in from the edges of the back of the cover, as the covered book dwells between each of its successive advances.

Figure 7:
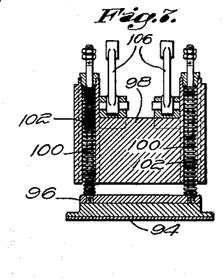
Fig. 7 is a fragmentary sectional view taken along the line 7—7 of Fig. 4.

Below the first set of creaser jaws at station B are presser plates 94, 94 arranged to press the sides of the books, these plates being shown in Figs. 4 and 7. These presser plates are attached to slides that are preferably made in two sections 96, 98 which are connected by pins 100 and interposed springs 102 so arranged that the plates will be cushioned when pressed against the books. The side edges of the plate slides are movably supported in grooves in cross plates 104 so that the plates they carry may be moved transversely. Connected with the rear sections of the plate slides are toggle links 106, 106 joined to toggle links 108, 108 that are fastened to the shafts 110, 110. On these shafts are segmental gears 112, 112. Meshed with these segmental gears are gears 114, 114 that are engaged with teeth of the vertical racks 86, 86. As the racks go up the creaser toggles 78, 80 open upward and the creaser jaws move out and at the same time the plate toggles 106, 108 open downward and the presser plates move out. When the racks go down the toggles straighten and the creaser jaws and presser plates are moved against a book.

The presser plates 94, 94 cooperate with the carrier jaws 14, 14 to press the books over the major portions of their cover areas to preliminarily secure adherence of the covers to the fillers. This preliminary pressing is followed by a final pressing as hereinafter set forth.

The machine may be adjusted for books of different thicknesses by means of shafts 116, 116 which are operably connected with each other by bevel gearing 118 and by a transverse shaft near the front of the machine as shown in Fig. 1. At several points along the machine there are short transverse shafts connected with the shafts 116 by means of bevel gearing 120, 120; one pair of the said shafts being shown at 122, 122 in Figs. 8 and 10. The transverse shafts 122 have threaded engagement with the rails 42, 42, and therefore when the shafts 116, 116 are turned the rails and the parts carried thereby are moved inward or outward to uniform extents. Transverse adjustment of the rails is permitted by reason of the before-described tongue-and-groove connections between the posts 58, 58 and the blocks 60, 60. The operating mechanisms 48, 48 for the slides 44, 44 are so connected with the arms 49, 49 as to permit them to move transversely with the rails.

No special means is required for adapting the creaser jaws 16, 16 and the presser plates 94, 94 for books of different thicknesses, inasmuch as the springs 72, 72 and 102, 102 provide sufficient relative movements to accommodate differences in thickness.

The machine may be adjusted for books of different widths by vertically adjusting the supporting rail 62. This rail may be vertically adjusted by means of a shaft 124 extending along one side of the machine. The shaft 124 is connected by bevel gearing 126, 126 with transverse shafts 128, which serve by means not shown to move the rail vertically.

In the machine set forth the books are transferred to the several sets of creaser jaws which apply heat and pressure a plurality of times to each book. As a result of such plurality of applications, the temperatures and pressures may be effected at degrees that will set the joints without disfiguring the material of the covers. The degrees of temperature of all the creasers may be the same or may be different, depending on the type and regulation of heaters employed. The force of pressure of the creasers may be the same or be different according to the outlines of the closing cams. Ordinarily the various cams are so shaped and related that the books are quickly advanced to the respective stations, and then remain at the said stations for longer periods of time in order to enable the presser jaws and the creaser jaws to have their required effects.

The machine as thus far described is similar to that disclosed in my aforesaid Patent No. 2,151,991, and reference can be had to the said patent as to any details which are not herein fully shown. The mechanism to be now described is additional to that shown in the patent, and in general the said additional mechanism provides a transfer station G and a pressing station H, which are additional to stations A, B, C, D, E and F, shown in the said patent.

Figure 10:
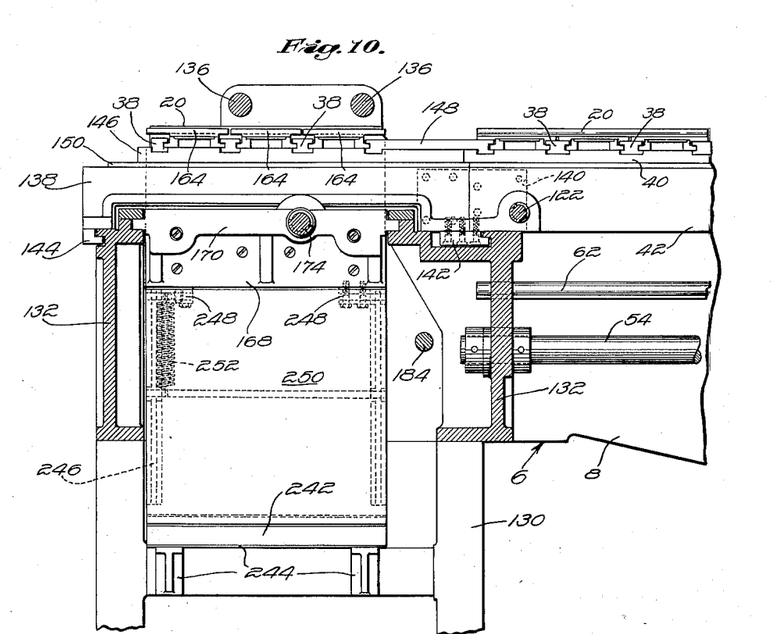
Fig. 10 is a vertical sectional view taken along the line 10—10 of Fig. 9.

A supplemental base 130 is provided which supports a supplemental frame 132. The said frame 132 directly engages the end of the main frame 6, being connected therewith by bolts or otherwise. One wall of the frame 132 supports the outer ends of the guide rods 54 as shown in Fig. 10. Connected with the frame 132 at the opposite sides thereof are side plates 134, 134 which are provided with upward extensions connected with each other by means of tie rods 136, 136. The side plates 134, 134 are respectively in register with the side plates 8, 8 of the main frame as shown in Fig. 8.

The rails 42, 42 are extended across the frame 132. These rail extensions may be integral with the main rails, but they are shown as separate members 138, 138 connected with the main rails by splice plates 140, 140. The rail extensions 138, 138 are guided for transverse adjustment in unison with the rails 42, 42. As shown in Fig. 10, each of them is provided with a plate 142 guided in a channel in the frame 132 and with a gib 144 engaging a flange on the said frame. It will be seen that, when the rails 42, 42 are adjusted transversely by means of the shafts 116, 116 and associated parts, the rail extensions 138, 138 are similarly adjusted.

Figure 9:
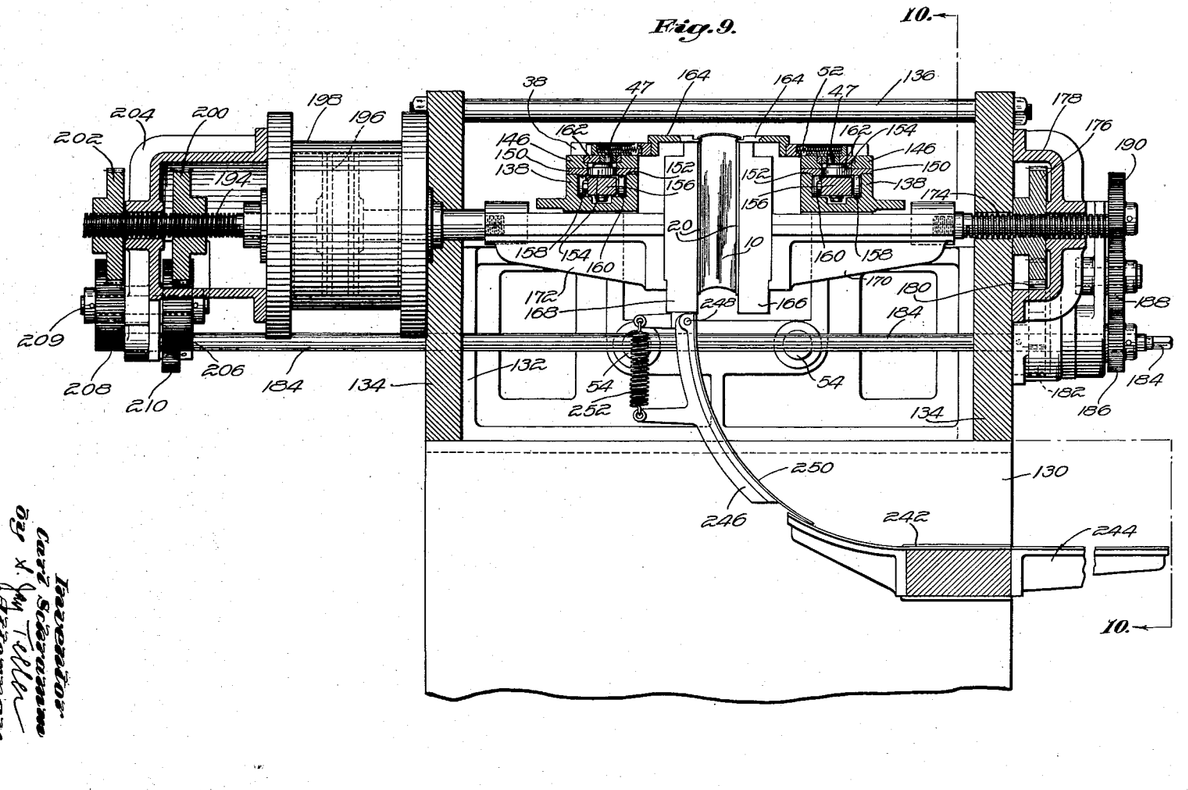
Fig. 9 is an enlarged vertical sectional view taken along the line 9—9 of Fig. 1ª.

The carriages 40, 40 are also extended across the frame 132. These carriage extensions may be integral with the main carriages, but they are shown as separate members 146, 146. The extensions are connected with the main carriages by plates 148, 148, as shown in Figs. 8 and 10. Each carriage extension 146 is supported and guided on the corresponding rail extension 138 by means similar to that provided for supporting and guiding each main carriage on its rail. As shown in Fig. 9, plates 150 and 152 are interposed between the carriage extension and the rail extension being secured to the latter. A stud projects downward from the carriage extension and carries a roller 154 which is movable in the longitudinal slot between the plates 150 and 152. The said stud engages a block 156 which is positioned in a longitudinal channel in the rail extension. The block 156 carries rollers 158 and 160 which are movable along the bottom of the channel in the rail extension and along the respective plates 150 and 152. The rollers 154, 158 and 160 are preferably mounted on antifriction bearings, and thus the carriage extension is readily movable longitudinally and is firmly guided when so moved.

The slides 44, 44 are also extended across the frame 132. These slide extensions may be integral with the main slides, but they are shown as separate members 162, 162 suitably connected by means not shown. Supported on the carriage extensions are carrier jaws 164, 164 which are supported and actuated in exactly the same manner as the carrier jaws 14, 14. As shown, there are three jaws at each side. The jaws 164, 164 differ from the jaws 14, 14 in that they are differently shaped so as to engage the books at the creases that have been formed by the several sets of creaser jaws 16, 16. This is clearly shown in Fig. 9.

In the operation of the machine as already described, the last set of carrier jaws 14, 14 at the left moves the successive books from the last creasing station F to the transfer station G as shown in Fig. 1ᵃ. At the said transfer station G the successive books are thereafter engaged by the said carrier jaws 164, 164, and are thereby moved from the said station G to the final pressing station H in the frame 132. Fig. 8 shows the carriages 40, 40 and the carrier jaws 14, 14 in their extreme position toward the left, as viewed in Fig. 1ᵃ, and a book has been moved to the final station H by the carrier jaws 164, 164. When moved to station H as shown in Fig. 8, each book is supported solely at the creases or joints thereof, as shown in Fig. 9; and the entire areas of the covers below or beyond the joints are exposed. The before-mentioned supporting rail 62 terminates short of the final station H. A portion of the rail 62 at station G is shown in Fig. 10, but the parts for supporting and adjusting it are omitted. The rail 62 is necessary at station G as there are no creasing jaws at this station, and the rail serves to support each successive book while the carrier jaws 14, 14 are disengaged therefrom and are moving toward the right to engage the next following book.

As already explained, the rail 62 is adjustable vertically for different book widths by means of the shaft 124. The said shaft 124 is provided with an extension 165 carried by the frame 132. The end of the extension shaft 165 is adapted to receive a wrench by means of which it may be turned, thus turning the shaft 124.

As already explained, the covers of the books are initially pressed against the pasted fillers by the carrier jaws 14, 14 and by the presser plates 94, 94 at station B. However, the amount of pressure applied by the plates 94, 94 is limited by their springs, and the said carrier jaws 14, 14 and the said plates 94, 94 do not engage the entire areas of the covers. Furthermore, the pressures applied by the said carrier jaws and the said presser plates are not uniform. In accordance with the present invention, additional pressing means are provided at the final station H which not only engage the entire areas of the covers but which apply much greater pressure than can be applied by the spring-actuated plates 94, 94.

As shown in Fig. 9, two presser plates 166, 168 are provided at the final station H, these plates being immediately beneath the final carrier jaws 164, 164 when the said jaws have been moved from station G to station H, as shown in Fig. 8. These plates are positioned so that their upper edges are substantially in transverse register with the creased cover joints of the books formed by the creaser jaws and the plates are of such size that they engage the entire cover areas of the successive books below or beyond the said creased joints. The said plates are of sufficient size to engage the cover areas of the largest book which the machine is adapted to handle. The plates 166 and 168 are carried respectively by slides 170 and 172 which are movable transversely in ways formed on the frame 132.

A transversely extending nonrotatable threaded rod 174 is secured to the slide 170, this rod being shown in Figs 1ª, 8 and 9. A gear 176 has threaded engagement with the rod 174, this gear abutting against the adjacent side plate 134 and being held against longitudinal movement by means of a yoke 178 secured to the said side plate. The gear 176 meshes with an idler gear 180 and the said idler gear meshes with a gear 182 secured to a transverse shaft 184. The shaft 184 carries a gear 186 which meshes with an idler gear 188. The idler gear 188 meshes with a gear 190 on a short transverse shaft 191, which shaft carries at its inner end a bevel gear 192 which meshes with the bevel gearing 120 at the end of the corresponding shaft 116. The shaft 184 is squared or otherwise shaped at its end to receive a wrench, and it will be seen that when the shaft 184 is turned, the gear 176 is rotated to move the rod 174 endwise, thus correspondingly moving the slide 170 and the pressure plate 166. Rotation of the shaft 184 serves also to rotate the two shafts 116, 116 and to thus move the carriage supporting rails transversely. Thus, by rotating the shaft 184 all of the carrier jaws and also the presser plate 166 can be adjusted transversely and in unison in accordance with the thickness of the books that are to be handled.

A transversely extending nonrotatable rod 194 is secured to the slide 172, the outer end portion of this rod being threaded. Secured to the said rod 194 is a piston 196 longitudinally movable in a cylinder 198 secured to the side plate 134 which is at the left as viewed in Fig. 9. Two gears 200 and 202 are in threaded engagement with the rod 194 and these gears are longitudinally movable within narrow limits as determined by a yoke 204 which extends between them and has an aperture for receiving the rod 194. The yoke is mounted on the end of the cylinder 198. The gears 200 and 202 mesh respectively with idler gears 206 and 208, which are secured to a short transverse shaft 209 for rotation in unison. One of the last said gears, as for instance the gear 206, meshes with a gear 210 secured to the shaft 184. It will be seen that when the shaft 184 is rotated in the manner already described, the gears 200 and 202 are rotated to move the rod 194 longitudinally, movement of the rod causing the slide 172 and the presser plate 168 to similarly move. The rods 174 and 194 are oppositely threaded and it will be seen that the presser plates 166 and 168 are moved in opposite directions, both of them moving inward simultaneously, and both of them moving outward simultaneously.

As already stated, the gears 200 and 202 are mounted for limited endwise movement to the extent permitted by the yoke 204. Thus the presser plate 168 is not definitely positioned by the gears 200 and 202 and is always free for movement within the narrow limits stated. This narrow range of relative movement of the plate 168 is utilized for applying pressure to the book in the final station, such pressure being exerted by means of fluid, preferably air, introduced into the cylinder 198 in the manner to be described and acting against the piston 196.

Figure 11:
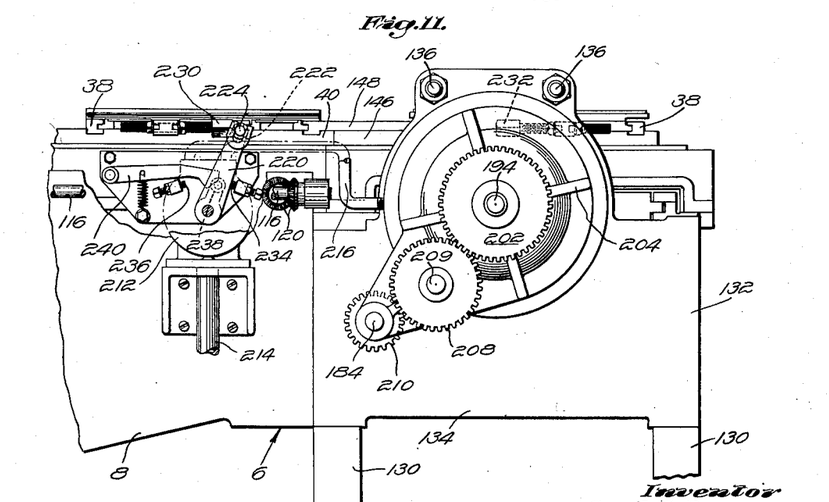
Fig. 11 is a side view taken from the left of the machine as shown in Fig. 8.

At the left side of the machine, as viewed in Figs. 8 and 11, is an air valve 212 receiving air under pressure through a pipe 214. Pipes 216 and 218 connect the valve with the cylinder 198 at opposite sides of the piston 196. The valve 212 is provided with an operating lever 220 which can be oscillated to change the connections through the pipes 216 and 218 so as to supply air under pressure to either side of the piston 196 and to exhaust air from the side opposite to that to which air is supplied.

Mounted for oscillation about the same axis as the lever 220 is a lever 222 carrying a transverse pin 224 which enters a slot in the upper end of the lever 220. It will be seen that the two levers are thus connected for oscillation in unison. Connected with the lever 222 for oscillation in unison therewith is a lever 226 carrying a transversely projecting pin 228. Mounted on the left hand carriage are two longitudinally adjustable actuating members 230 and 232 which are adapted to engage the pin 228 as the carriage is reciprocated. Engagement of the pin by one or the other of the actuating members serves to turn the lever 226 and to thus turn the levers 222 and 220 with the result that the valve is thrown from one extreme position to the other.

Adjustable stops 234 and 236 are provided, these being adapted to engage the lever 226 to limit the movements thereof. The lever 222 carries a roller 238 which is engageable with a spring-pressed detent arm 240. The arm 240 yields to permit the roller 238 to pass under it but it tends to hold the lever 222 and the parts connected therewith in one or the other of their extreme positions of movement.

As has already been explained, the successive books after being initially pressed by the carrier jaws 14, 14 and the presser plates 94 at station B and after being creased by the creaser jaws 16, 16 at stations B, C, D, E and F are engaged by the final carrier jaws 164, 164 at station G and are moved to the final station H within the frame 132. As each book reaches the said final station, the lever 226 is moved by the actuating member 230 to shift the position of the valve so as to admit air under pressure through the pipes 216 to the outer side of the piston 196. The piston then moves the presser plate 168 inward to compress the book between the said plate 168 and the plate 166. Pressure is applied to each book by the plates 168 and 166 through a substantial interval of time, this interval being approximately the same as that of the engagement of the creaser jaws with the book at each station. During this interval the carrier jaws 164, 164 are disengaged from the book and the carriages move in the direction to return the said jaws to station G to pick up the next following book which has been delivered to that station by the corresponding carrier jaws 14, 14. This brings the actuating member 232 into engagement with the pin 224 to reverse the position of the valve 212. Thereupon air is supplied to the inner side of the piston 196 and the presser plate 168 is withdrawn from the book, thus releasing it so that it can move downward by gravity.

It will be seen that when air is introduced to the inner end of the cylinder 198, the piston 196 is moved outward to the extent permitted by the engagement of the gear 200 with the yoke 204. When air is introduced to the outer end of the cylinder, the piston is moved inward until the plate 168 engages the book, and inward movement would in any event be limited by engagement of the gear 202 with the yoke 204. The extent of movement of the piston 196 and of the presser plate 168 is always the same, or substantially so, but their outer positions are adjustable in accordance with book thickness by rotation of the gears 200 and 202 as already described. Thus the plate 168 in its outer position is always at a predetermined distance from the corresponding book cover, and it moves through a fixed distance to apply pressure. Therefore, the amount of air required is always substantially the same, and the time required for applying pressure is always substantially the same.

The plates 168 and 166 engage the entire areas of the covers of the book as already pointed out. Inasmuch as very considerable pressure is applied by the plates as the result of the air pressure, the covers are flattened and firmly pressed against the filler to insure adherence between the cover and the pasted outer sheets of the filler. The presser plates 168 and 166 supplement the action of the carrier jaws 14, 14 and the presser plates 94, 94 and are much more effective, partly because the plates 166 and 168 cover the entire areas of the cover, partly because the pressure applied by the plates 166 and 168 is considerably greater, and partly because the paste has partly dried and is in condition for final setting.

As already stated, the supporting rail 62 which extends underneath the books at the earlier stations of the machine does not extend into the final station H. At station H the books are supported first by the carrier jaws 164, 164 and then by the plates 168, 166. As soon as each book is released by the plates 168, 166 it moves downward by gravity, and a suitable guideway or chute is provided to receive it. As shown, a shelf 242 is provided in an opening in the base 130, the inner end of the shelf being curved upward. A bracket 244 secured to the base 130 constitutes an extension of the shelf. A curved guide plate 246 is longitudinally pivoted to the plate 168 at 248, this plate having a sheet metal facing 250 which overlaps the curved end of the shelf 242. A spring 252 biases the plate 246 to hold the facing 250 in engagement with the shelf for all positions of the presser plate 168. Thus, as each book is released, it moves downward by gravity and is guided by the plate 246 and the facing 250 onto the shelf 242 and the bracket 244. The successive books can be removed by hand from the shelf 242 and the bracket 244 or they can pass onto a suitable conveyor, not shown.

What I claim is:

1. In a machine for acting upon a succession of books having covers applied and pasted thereto but with the paste initially not set, the combination of mechanism for intermittently moving the books from station to station along a predetermined path, oppositely disposed creasing jaws at least at one of the said stations which jaws have narrow book engaging portions positioned in transverse register with the lines of the cover joints to be formed on the successive books and which jaws of each set are movable toward and from each other but are held against movement in the direction of book movement, mechanism automatically operable while successive books are at the said creasing jaw stations for moving the creasing jaws toward each other to apply pressures to the sides of the book covers so as to form creases at the said cover joints, two oppositely disposed parallel pressure plates at the final station of book movement which are so positioned that edges thereof are substantially in transverse register with the creased cover joints of the books at the last said station and which are of such size as to be adapted to engage the entire areas of the covers of the said books beyond the said cover joints thereof, and mechanism automatically operable while the successive books are at the said final station for moving at least one of the pressure plates toward the other to apply pressure to the last aforesaid areas of the covers of each of the said successive books.

2. In a machine for acting upon a succession of books having covers applied and pasted thereto but with the paste initially not set, the combination of mechanism for intermittently moving the books from station to station along a predetermined path, a plurality of sets of oppositely disposed creasing jaws at certain of the said stations which creasing jaws have narrow book engaging portions positioned in transverse register with the lines of the cover joints to be formed on the successive books and which creasing jaws of each set are movable toward and from each other but are held against movement in the direction of book movement, mechanism automatically operable while successive books are at the said creasing jaw stations for moving the creasing jaws of the several sets toward each other to apply successive pressures to the sides of the book covers so as to form creases at the said cover joints, a set of oppositely disposed parallel pressure plates located at the first creasing jaw station and so positioned and of such size as to engage the book covers over major portions of the areas thereof, mechanism automatically operable while successive books are at the last said station for moving the said pressure plates toward each other to cause them to apply pressures to the last said areas of the book covers and thereby cause initial adherence between the books and the covers, two oppositely disposed parallel pressure plates at the final said station of book movement which are so positioned that edges thereof are substantially in transverse register with the creased cover joints of the books at the last said station and which are of such size as to be adapted to engage the entire areas of the covers of the said books beyond the said cover joints thereof, and mechanism automatically operable while the successive books are at the said final station for moving at least one of the pressure plates toward the other to apply pressure to the last aforesaid areas of the covers of each of the said successive books.

3. In a machine for acting upon a succession of books having covers applied and pasted thereto but with the paste initially not set, the combination of mechanism for intermittently moving the books from station to station along a predetermined path, a plurality of sets of oppositely disposed creasing jaws at certain of the said stations, mechanism operable while successive books are at the last said stations for moving the creasing jaws toward each other to apply pressures to the sides of the book covers so as to form creases at the said cover joints, a plurality of sets of oppositely disposed carrier jaws for engaging the books at the several stations except the final station, the jaws of the first set being positioned to engage the books at narrow areas closely adjacent the lines of the cover joints, mechanism for moving the carrier jaws to successively engage the books at the last said stations and move the said books to the next following stations, a set of oppositely disposed parallel pressure plates located at the first creasing jaw station and so positioned and of such size as to engage the book covers over substantially the entire areas thereof not engaged by the creasing jaws and the carrier jaws at the said first station, mechanism operable while successive books are at the said first station for moving the said pressure plates toward each other to cause them to apply pressures to the book covers and thereby cause initial adherence between the books and the covers, two oppositely disposed parallel pressure plates at the final station of book movement which are so positioned that edges thereof are substantially in transverse register with the creased cover joints of the books and which are of such size as to be adapted to engage the entire areas of the covers of the said books beyond the said cover joints thereof, and mechanism operable while the successive books are at the said final station for moving at least one of the pressure plates toward the other to apply pressure to the last aforesaid cover areas.

4. In a machine for acting upon a succession of pasted books having covers applied thereto but with the paste initially not set which books are positioned with their backs upward, the combination of means for intermittently moving the books from station to station along a predetermined path, creasing jaws at certain of the said stations for applying pressures to the sides of the covers of the books to form creases along the lines of the horizontal cover joints, a set of oppositely disposed carrier jaws adjacent the final end of the said path adapted to engage the books at the creases formed by the said creasing jaws which jaws are positioned and shaped to leave unobstructed spaces below the said creases, means operating in a cycle for moving the said carrier jaws inward to engage the books and for then moving the jaws longitudinally to move the books to the final station of book movement, the said jaws being then moved outward to release the books and being returned longitudinally to their original positions, two oppositely disposed parallel pressure plates at the final station which are so positioned that their upper edges are below the carrier jaws and substantially in transverse register with the creased cover joints of the books at the said final station and which are of such size as to be adapted to engage the entire areas of the covers of the said books below the said cover joints thereof, and mechanism operable while the successive books are at the said final station and before the books are released by the said carrier jaws for moving at least one of the pressure plates toward the other to apply pressure to the last aforesaid areas of the covers of each of the said books.

5. In a machine for acting upon a succession of pasted books having covers applied thereto but with the paste initially not set which books are positioned with their backs upward, the combination of a series of sets of oppositely disposed carrier jaws uniformly spaced along a predetermined path and adapted to engage opposite sides of successive books, means operating in a cycle for moving the carrier jaws inward to engage the books and for then moving the jaws longitudinally to move the books to successive stations along the said path, the said jaws being then moved outward to release the books and being returned longitudinally to their original positions, creasing jaws at certain of the said stations for applying pressures to the sides of the covers of the books to form creases along the lines of the horizontal cover joints, a supplemental set of oppositely disposed carrier jaws at the final end of the series movable in unison with the first said carrier jaws and by the same operating means, which said supplemental carrier jaws are adapted to engage the books at the creases formed by the said creasing jaws and are positioned and shaped to leave unobstructed spaces below the said creases and which said supplemental carrier jaws serve to move the books to the final station of book movement, two oppositely disposed parallel pressure plates at the final station which are so positioned that their upper edges are below the said supplemental carrier jaws and are substantially in transverse register with the creased cover joints of the books at the final station and which are of such size as to be adapted to engage the entire areas of the covers of the said books below the said cover joints thereof, and mechanism operable while the successive books are at the said final station and before the books are released by the supplemental carrier jaws for moving at least one of the pressure plates toward the other to apply pressure to the last aforesaid areas of the covers of each of the said books.

6. In a machine for acting upon a succession of pasted books having covers applied thereto but with the paste initially not set which books are positioned with their backs upward, the combination of a series of sets of oppositely disposed carrier jaws uniformly spaced along a predetermined path and adapted to engage opposite sides of successive books, means operating in a cycle for moving the carrier jaws inward to engage the books and for then moving the jaws longitudinally to move the books to successive stations along the said path, the said jaws being then moved outward to release the books and being returned longitudinally to their original positions, creasing jaws at certain of the said stations for applying pressures to the sides of the covers of the books to form creases along the lines of the horizontal cover joints, a supplemental set of oppositely disposed carrier jaws at the final end of the series movable in unison with the first said carrier jaws and by the same operating means which said supplemental carrier jaws are adapted to engage the books at the creases formed by the said creasing jaws and are positioned and shaped to leave unobstructed spaces below the said creases and which said supplemental carrier jaws serve to move the books to the final station of book movement, two oppositely disposed parallel pressure plates at the final station which are so positioned that their upper edges are below the said supplemental carrier jaws and are substantially in transverse register with the creased cover joints of the books at the final station and which are of such size as to be adapted to engage the entire areas of the covers of the said books below the said cover joints thereof, fluid pressure means for moving at least one of the pressure plates, and means actuated by the operating means for the carrier jaws for controlling the fluid pressure means so as to move at least one of the pressure plates inward and apply pressures to the said areas of the covers while the books are stationary at the final station.

7. In a machine for acting upon a succession of pasted books having covers applied thereto but with the paste initially not set which books are positioned with their backs upward, the combination of means for intermittently moving the books from station to station along a predetermined path, automatically operated creasing jaws at certain of the said stations for applying pressures to the sides of the covers of the books to form creases along the lines of the horizontal cover joints, a set of oppositely disposed carrier jaws adjacent the final end of the said path adapted to engage the books at the creases formed by the said creaser jaws which jaws are positioned and shaped to leave unobstructed spaces below the said creases, means automatically operating in a cycle for moving the said carrier jaws inward to engage the books at the station next to the final station and for then moving the jaws longitudinally to move the books to a final station, the said jaws being then moved outward to release the books and being returned longitudinally to their original positions, two oppositely disposed parallel pressure plates at the final station of book movement which are so positioned that their upper edges are below the said carrier jaws and are substantially in transverse register with the creased cover joints of the books at the last said station and which are of such size as to be adapted to engage the entire areas of the covers of the said books below the said cover joints thereof, mechanism automatically operable while the successive books are at the said final station and before the books are released by the said carrier jaws for moving at least one of the pressure plates toward the other to apply pressure to the last aforesaid areas of the covers of each of the said books, the said mechanism enabling the pressure plates to constitute the sole support for the books after release thereof by the said carrier jaws, and a guideway for the discharge of the books by gravity from the final station as they are successively released by the pressure plates.

8. In a machine for acting upon a succession of pasted books having covers applied thereto but with the paste initially not set, the combination of means for intermittently moving the books from station to station along a predetermined path, creasing jaws at certain of the said stations for applying pressures to the sides of the covers of the successive books to form creases along the lines of the cover joints, pressure plates at the final station positioned to engage the entire areas of the covers of the successive books beyond the said joints, fluid pressure means for causing the said plates to apply pressure to the covers of each book at the final station, a valve controlling the flow of fluid to the fluid pressure means, and means actuated by the intermittently acting book moving means for operating the valve to cause the fluid pressure means to apply the said pressure upon the arrival of each book at the final station and to release the said pressure immediately prior to the arrival of the next following book.

9. In a machine for acting upon a succession of pasted books having covers applied thereto but with the paste initially not set, the combination of means for intermittently moving the books from station to station along a predetermined path, creasing jaws at certain of the said stations for applying pressures to the sides of the covers of the successive books to form creases along the lines of the cover joints, oppositely disposed pressure plates at the final station positioned to engage the entire areas of the covers of the successive books beyond the said joints, means for holding one of the said plates normally stationary and in approximate contact with the adjacent cover, and means for moving the other plate inward to apply pressure to the said covers of the book and for subsequently moving the last said plate outward, the last said means being timed to move the last said plate inward upon the arrival of each book at the said final station and to move the last said plate outward to release the book immediately prior to the arrival of the next following book.

10. In a machine for acting upon a succession of pasted books having covers applied thereto but with the paste initially not set, the combination of means for intermittently moving the books from station to station along a predetermined path, creasing jaws at certain of the said stations for applying pressures to the sides of the covers of the successive books to form creases along the lines of the cover joints, oppositely disposed pressure plates at the final station positioned to engage the entire areas of the covers of the successive books beyond the said joints, means for holding one of the said plates in a normally fixed position in approximate contact with the adjacent cover, means for moving the other plate inward from a normally fixed outer position to apply opposed inward pressures to the book covers, and means for simultaneously changing the normally fixed position of the first said plate and the normally fixed outer position of the second said plate to accommodate books of different thicknesses.

11. In a machine for acting upon a succession of pasted books having covers applied thereto but with the paste initially not set, the combination of a series of sets of oppositely disposed carrier jaws uniformly spaced along a predetermined path, means operating in a cycle for moving the carrier jaws inward to engage opposite sides of successive books and for then moving the jaws longitudinally to move the books to successive stations along the said path, the said jaws being then moved outward to release the books and being returned longitudinally to their original positions, creasing jaws at certain of the said stations for applying pressures to the sides of the covers of the books to form creases along the lines of the cover joints, pressure plates at the final station positioned to engage the entire areas of the covers of the successive books beyond the said joints, means for holding one of the said plates in a normally fixed position in approximate contact with the adjacent cover, means for moving the other plate inward from a normally fixed outer position to apply opposed inward pressures to the book covers, and means for adjusting the carrier jaws transversely to accommodate books of different thicknesses and for simultaneously changing the normally fixed position of the first said plate and the normally fixed outer position of the second said plate to accommodate books of different thicknesses.

CARL SCHRAMM.

References Cited in the file of this patent

UNITED STATES PATENTS

| Number | Name | Date |
|---|---|---|
| 626,115 | Von Auw | May 30, 1899 |
| 2,098,060 | Moyer | Nov. 2, 1937 |
| 2,151,991 | Schramm | Mar. 28, 1939 |
| 2,163,812 | Schramm | June 27, 1939 |